(12) United States Patent
Luccarelli et al.

(10) Patent No.: US 8,663,378 B2
(45) Date of Patent: Mar. 4, 2014

(54) ASPHALT MIX WORKABLE AT AMBIENT TEMPERATURES WITH ONLY BIODEGRADABLE SOLVENTS AND METHOD OF MANUFACTURING THE SAME

(75) Inventors: Charles J. Luccarelli, New Canaan, CT (US); Dario Amicucci, Armonk, NY (US); Warren Day, Wantagh, NY (US)

(73) Assignee: Green Product Solutions, Inc., Bronx, NY (US)

( * ) Notice: Subject to any disclaimer, the term of this patent is extended or adjusted under 35 U.S.C. 154(b) by 0 days.

(21) Appl. No.: 13/595,723

(22) Filed: Aug. 27, 2012

(65) Prior Publication Data

US 2013/0055925 A1    Mar. 7, 2013

Related U.S. Application Data

(63) Continuation of application No. 12/657,851, filed on Jan. 28, 2010, now Pat. No. 8,287,635.

(60) Provisional application No. 61/207,267, filed on Feb. 10, 2009.

(51) Int. Cl.
    *C08L 95/00*    (2006.01)

(52) U.S. Cl.
    USPC ........................................ 106/278; 106/273.1

(58) Field of Classification Search
    USPC ............................................. 106/273.1, 278
    See application file for complete search history.

(56) References Cited

U.S. PATENT DOCUMENTS

| | | | | |
|---|---|---|---|---|
| 3,322,668 | A | 5/1967 | Fonteno et al. | 507/126 |
| 5,362,316 | A | 11/1994 | Paradise | 106/278 |
| 5,558,432 | A | 9/1996 | Swisher, Jr. | 366/25 |
| 6,117,227 | A | 9/2000 | Kitagawa | 106/284.01 |
| 6,126,757 | A | 10/2000 | Kinnaird | 134/37 |
| 6,139,612 | A | 10/2000 | Kitagawa | 106/284.1 |
| 6,156,113 | A | 12/2000 | Pasquier | 106/269 |
| 6,206,607 | B1 | 3/2001 | Medico, Jr. et al. | 404/2 |
| 6,214,103 | B1 | 4/2001 | Kitagawa | 106/284.01 |
| 6,764,542 | B1 | 7/2004 | Lackey et al. | 106/277 |
| 6,802,897 | B1 | 10/2004 | Lackey et al. | 106/503 |
| 7,037,955 | B2 | 5/2006 | Timcik et al. | 523/102 |
| 2004/0116557 | A1* | 6/2004 | Pounds et al. | 524/59 |
| 2006/0155003 | A1* | 7/2006 | Timcik et al. | 523/102 |
| 2008/0069638 | A1 | 3/2008 | Crews et al. | 404/17 |

FOREIGN PATENT DOCUMENTS

FR    2770850    5/1999

OTHER PUBLICATIONS

UK Examination Report (Sep. 2012).
PCT Preliminary Report on Patentability Aug. 25, 2011.
English language machine translation of Fr. 2770850, (May 1999).

* cited by examiner

*Primary Examiner* — Anthony J Green
(74) *Attorney, Agent, or Firm* — Donna L. Angotti; The Law Offices of Donna L. Angotti (57) ABSTRACT

A method of manufacturing an asphalt mix comprising: heating aggregate; introducing RAP to the aggregate; dry mixing the RAP and aggregate; forming a coating of AC on all aggregate during the step of dry mixing by extending the length in time of the dry mixing step; separately blending AC, biodegradable solvents, and anti-stripping agent to produce a blend; and wet mixing the blend into the RAP and aggregate mix. The biodegradable solvents are capable of making the asphalt mix workable at ambient temperatures and comprise pine extract and biodiesel. The length of the dry mixing is extended to at least about 35 seconds. The aggregate comprises coarse and fine virgin aggregate. RAP is about 40% of the final product. The asphalt mix is stockpiled and bagged. The method further comprises manipulating encrusted material on the outside of the stockpiled cold asphalt mix back into the stockpile.

20 Claims, 3 Drawing Sheets

| SIEVE SIZE | | 1½" (37.5) | 1" (25.0) | ¾" (19.0) | ½" (12.5) | 1" (6.3) | 1/8" (3.2) | 20 (0.850) | 40 (0.425) | 80 (0.180) | 200 (0.075) | ASPHALT CONTENT (TOTAL) |
|---|---|---|---|---|---|---|---|---|---|---|---|---|
| % PASSING | 1. GENERAL LIMITS | – | 100 | | 90–100 | 48–82 | 12–28 | | | | 0–2 | |
| | 2. JMF RANGE | – | 100 | | 90–100 | 48–82 | 12–28 | | | | 0–2 | 3.5% – 5.0% |
| | 3. TARGET VALUE | – | 100.0 | | 100.0 | 70.1 | 21.1 | | | | 1.3 | |

U.S. STD. – SIZES RAISED TO 0.45 POWER

Fig. 2a

GRADATION ANALYSIS WORKSHEET

NO. OF HOT BINS AVERAGED   15

| AGGREGATE INFORMATION | | | AGGREGATE BLEND % | |
|---|---|---|---|---|
| AGGREGATES | | SOURCE NUMBER | | |
| COARSE | No. 2 STONE | 8–10R | | |
| | No. 1 STONE | 8–10R | 0.0 % | #1 HIGH FRICTION BLEND |
| | No. 1 NON-CARBONATE STONE | | | |
| | No. 1A STONE | 8–9R | 55.0 % | #1A HIGH FRICTION BLEND |
| | No. 1A NON-CARBONATE STONE | | | |
| FINE | MANUFACTURED | 8–9FM | 5.0 % | MANUFACT/ NATURAL SAND BLEND |
| | NATURAL | | | |
| | RAP | | 40.0 % | |

GRADATION ANALYSIS WORKSHEET

AVERAGE BIN BREAKDOWN

| SIEVE SIZES | BIN NO. 1 | | BIN NO. | | BIN NO. | | BIN NO. | | MANU. SAND BIN NO. | | RAP | |
|---|---|---|---|---|---|---|---|---|---|---|---|---|
| | % RET | % PASS | % RET | % PASS | % RET | % PASS | % RET | % PASS | % RET | % PASS | % RET | % PASS |
| 1½" | | | | | | | | | | | | |
| 1" | | | 0.0 | 100.0 | 0.0 | 100.0 | | | 0.0 | 100.0 | 0.0 | 100.0 |
| ¾" | | | 0.0 | 100.0 | 0.0 | 100.0 | | | 0.0 | 100.0 | 0.0 | 100.0 |
| ½" | | | 0.4 | 99.6 | 0.0 | 100.0 | 0.0 | 100.0 | 0.0 | 100.0 | 0.0 | 100.0 |
| ¼" | | | 84.8 | 15.0 | 28.0 | 72.0 | 4.8 | 95.2 | 35.7 | 64.3 | | |
| ⅛" | | | 14.1 | 0.9 | 56.3 | 15.7 | 16.0 | 79.2 | 43.0 | 21.3 | | |
| 20 | | | | | | | 30.5 | 48.7 | 11.8 | 9.5 | | |
| 40 | | | | | | | 20.0 | 28.7 | 6.2 | 3.3 | | |
| 80 | | | | | | | 14.0 | 14.7 | 0.5 | 2.8 | | |
| 200 | | | | | | | 5.8 | 8.9 | 0.7 | 2.1 | | |
| PAN | 0.0 | | 0.9 | | 15.7 | | 8.9 | | 2.1 | | | |
| TOTALS | 0.0 | | 100.0 | | 100.0 | | 100.0 | | 100.0 | | | |

Fig. 2b

| BIN | % BATCH | % PASSING SIEVE | | | | | | | | | |
|---|---|---|---|---|---|---|---|---|---|---|---|
| | | 1½" | 1" | ¾" | ½" | ¼" | ⅛" | 20 | 40 | 80 | 200 |
| 1 | 0.0% | 0.0 | 0.0 | 0.0 | 0.0 | 0.0 | 0.0 | | | | |
| 2 | 55.0% | 55.0 | 55.0 | 55.0 | 55.0 | 39.6 | 8.6 | | | | |
| 3 | 5.0% | 5.0 | 5.0 | 5.0 | 5.0 | 4.8 | 4.0 | 2.4 | 1.4 | 0.7 | 0.4 |
| 4 | 40.0% | 40.0 | 40.0 | 40.0 | 40.0 | 25.7 | 8.5 | 3.8 | 1.3 | 1.1 | 0.8 |
| TOTAL | 100.0% | 100.0 | 100.0 | 100.0 | 100.0 | 70.1 | 21.1 | 8.2 | 2.8 | 1.9 | 1.3 |
| SPEC. LIMITS | 100 | 100 | 100 | 90–100 | 48–82 | 12–28 | | | | 0–2 |

Fig. 2c

ASPHALT MIX WORKABLE AT AMBIENT TEMPERATURES WITH ONLY BIODEGRADABLE SOLVENTS AND METHOD OF MANUFACTURING THE SAME

This application is a continuation of U.S. application Ser. No. 12/657,851 filed Jan. 28, 2010 now U.S. Pat. No. 8,287,635, which is incorporated herein by reference in its entirety. U.S. application Ser. No. 12/657,851 filed Jan. 28, 2010, issued as U.S. Pat. No. 8,287,635 B2 on Oct. 16, 2012. U.S. application Ser. No. 12/657,851 filed Jan. 28, 2010, was based upon U.S. Provisional application 61/207,267 filed Feb. 10, 2009, which is incorporated herein by reference in its entirety.

The present invention relates to an asphalt mix and the method of manufacturing the same.

BACKGROUND

Both cold mix asphalts (CMAs) and hot mix asphalts (HMAs) are known. The inventors have identified problems with known cold mix asphalts (CMAs) and hot mix asphalts (HMAs) as discussed below.

Traditionally, cold mix asphalts are generally used for patching and hot mix asphalts are generally used for paving.

Prior art cold mix asphalts include a petroleum solvent that makes them workable at ambient temperatures. They require precautions for toxicity when worked. Most prior art cold mix asphalts use only virgin aggregate.

U.S. Pat. No. 6,139,612 to Kitagawa et al., issued Oct. 31, 2000, for Asphalt Paving Mix Formed of Recycled Asphalt Concrete for Paving at Ambient Temperatures and a Process for Making the Same includes an additive oil which is disclosed as a hydrocarbon with petroleum hydrocarbons preferred. See col. 3, lines 10-17.

Prior art hot mix asphalts are not workable at ambient temperatures as the term suggests. They are only workable at temperatures of about 250 to 325 degrees F. They require heating. Hot mix asphalts are manufactured hot and are shipped hot. They require precautions for heat safety when manufactured, shipped and worked. The use of recycled asphalt in hot mix asphalts is known.

U.S. Pat. No. 6,764,542 to Lackey et al., issued Jul. 20, 2004, for Biodiesel Cutback Asphalt and Asphalt Emulsion, is owned by Marathon Petroleum (hereinafter the "Marathon Patent"). The Marathon Patent discloses a cutback asphalt and an asphalt emulsion comprising biodiesel. The Marathon Patent states, "Cutback is mixed with a sufficient amount of biodiesel to reduce the viscosity of the asphalt, producing, e.g., a cold patch material which is free of added liquid petroleum." See Abstract.

The Marathon Patent recognizes "the polluting effect of modern roads", col. 2, line 13. The Marathon Patent further states that "[a]ll cutback asphalts contain solvent", col. 1, line 65, and "When used to construct a parking lot or road, the amounts of solvent used, and discharged into the air are enormous", col. 2, lines 1-3.

In summary, the known asphalts including asphalts for patching are inadequate for reasons identified by the inventors discussed in detail below.

Therefore, the need exists for a better cold asphalt mix. The present invention provides a better cold asphalt mix.

BRIEF SUMMARY

None of the prior art asphalts and references mentioned above is an asphalt that is workable at ambient temperatures that is environmentally safe. None of the prior art asphalts and references mentioned above is an asphalt workable at ambient temperatures that only includes biodegradable solvents. The prior art does not disclose or show pine extract as a solvent. The prior art does not disclose an asphalt mix with biodegradable solvents capable of making the asphalt mix workable at ambient temperatures. The prior art further does not show an asphalt mix workable at ambient temperatures with biodegradable solvents capable of making the asphalt mix workable at ambient temperatures comprising RAP. These features are not shown where the absorption of the asphalt wet mix blend of AC, pine extract, biodiesel, and anti-stripping agent into the stone is decreased. An asphalt mix not subject to problems of toxicity and environmental hazards which is workable at ambient temperatures is not disclosed in the prior art mentioned above. The prior art mentioned further does not disclose a method of manufacturing an asphalt mix comprising blending AC and pine extract. The prior art mentioned does not disclose a method of manufacturing an asphalt mix comprising extending a length of dry mixing RAP and aggregate. Additionally, the prior art mentioned does not disclose a method of manufacturing an asphalt mix comprising forming a coating of AC on all aggregate during a step of dry mixing RAP and aggregate.

In general, in a first aspect, the invention features an asphalt mix comprising a pine extract, the asphalt mix having low viscosity at ambient temperatures, and workable at ambient temperatures.

The asphalt mix may comprise asphalt cement, biodiesel, and pine extract. The asphalt mix may further comprise an anti-stripping agent. The asphalt mix further comprises course aggregate and fine aggregate. The asphalt mix further comprises recycled asphalt product. The composition of the asphalt mix eliminates petroleum solvents. The asphalt mix is used for patching. The pine extract improves workability. The asphalt mix comprises about 1% to 7% pine extract. Preferably, the asphalt mix comprises about 1% pine extract. The asphalt mix comprises about 24% to 32% biodiesel. Preferably, the asphalt mix comprises about 28% biodiesel. The asphalt mix comprises about 40% RAP. The asphalt mix is workable without machinery. The asphalt mix is capable of being stockpiled. The asphalt mix is bagged and stored and sold in bags. The asphalt mix is used at ambient temperature as contemplated.

In general, in a second aspect, the invention features an asphalt mix comprising only solvents that are biodegradable, the asphalt mix having low viscosity at ambient temperatures, and workable at ambient temperatures.

The biodegradable solvents comprise pine extract.

The biodegradable solvents comprise pine extract and biodiesel as contemplated.

In general, in a third aspect, the invention features an asphalt mix consisting of aggregate, RAP, AC, biodegradable solvents capable of making the asphalt mix workable at ambient temperatures, and anti-stripping agent.

The biodegradable solvents comprise pine extract.

The biodegradable solvents comprise pine extract and biodiesel as contemplated.

In general, in a fourth aspect, the invention features a method of manufacturing an asphalt mix comprising blending AC and pine extract.

The method of manufacturing an asphalt mix comprises blending AC, pine extract and biodiesel as contemplated.

In general, in a fifth aspect, the invention features a method of manufacturing an asphalt mix comprising extending a length of dry mixing RAP and aggregate.

The method of manufacturing an asphalt mix contemplates a length of the dry mixing to be at least about 35 seconds. The method of manufacturing an asphalt mix contemplates using aggregate comprising coarse virgin aggregate and fine virgin aggregate. In the method of manufacturing an asphalt mix the aggregate is heated before the dry mix step to be hot. The method further contemplates introducing the RAP in an amount to make up about 40% of the final product. The method of manufacturing an asphalt mix extends the length of the dry mixing until moisture is substantially driven off. The method of manufacturing a cold asphalt mix extends the length of the dry mixing until AC from said RAP coats all aggregate.

In general, in a sixth aspect, the invention features a method of manufacturing an asphalt mix comprising forming a coating of AC on all aggregate during a step of dry mixing RAP and aggregate.

The method of manufacturing an asphalt mix contemplates a length of the dry mixing to be at least about 35 seconds. The method of manufacturing an asphalt mix extends the length of the dry mixing until moisture is substantially driven off. The method of manufacturing an asphalt mix contemplates the aggregate comprising coarse virgin aggregate and fine virgin aggregate. The method of manufacturing an asphalt mix further comprises the aggregate being heated before the dry mix step to be hot. The method of manufacturing an asphalt mix contemplates introducing the RAP in an amount to make up about 40% of the final product.

In general, in a seventh aspect, the invention features a method of manufacturing an asphalt mix comprising: heating aggregate; introducing RAP to the aggregate; dry mixing the RAP and aggregate; forming a coating of AC on all aggregate during the step of dry mixing; separately blending AC, biodegradable solvents, and anti-stripping agent to produce a blend; and wet mixing the blend into the RAP and aggregate mix.

The method of manufacturing an asphalt mix contemplates biodegradable solvents that are capable of making the asphalt mix workable at ambient temperatures. The biodegradable solvents comprise pine extract. The biodegradable solvents may comprise pine extract and biodiesel. The method of manufacturing an asphalt mix extends the length of the dry mixing until moisture is substantially driven off. The method of manufacturing an asphalt mix contemplates a length of the dry mixing step to be about 35 seconds. The method of manufacturing an asphalt mix contemplates the aggregate comprising coarse virgin aggregate and fine virgin aggregate. The method of manufacturing contemplates introducing the RAP in an amount to make up about 40% of the final product. The method further comprises stockpiling the asphalt mix. The method of manufacturing an asphalt mix further comprising bagging the asphalt mix. The encrusted material on the outside of the stockpiled asphalt mix is manipulated back into the stockpile as contemplated.

The above advantages and features are of representative embodiments only. It should be understood that they are not to be considered limitations on the invention as defined by the claims. Additional features and advantages of the invention will become apparent in the following description, from the drawing, and from the claims.

BRIEF DESCRIPTION OF THE DRAWINGS

FIG. 1b is a table listing the values graphed in the mix formula graph showing aggregate gradation of FIG. 1a.

DESCRIPTION

The asphalt mix of the invention comprises a pine extract, has low viscosity at ambient temperatures, and is workable at ambient temperatures. The asphalt mix of the invention comprises asphalt cement, biodiesel, and pine extract. The asphalt mix comprises only solvents that are biodegradable, has low viscosity at ambient temperatures, and is workable at ambient temperatures. The biodegradable solvents comprise pine extract and biodiesel. The invention is an asphalt mix consisting of aggregate, RAP, AC, biodegradable solvents capable of making the asphalt mix workable at ambient temperatures, and anti-stripping agent. The biodegradable solvents comprise pine extract and biodiesel.

The invention contemplates a method of manufacturing an asphalt mix comprising blending AC, pine extract and biodiesel. The invention is a method of manufacturing an asphalt mix comprising extending a length of dry mixing RAP and aggregate. The length of the dry mixing time is extended until moisture is substantially driven off and AC is dispersed over all aggregate. The method of manufacturing an asphalt mix contemplates a length of the dry mixing to be at least about 35 seconds.

The invention is a method of manufacturing an asphalt mix comprising forming a coating of AC on all aggregate during a step of dry mixing RAP and aggregate. The method of manufacturing an asphalt mix contemplates a length of the dry mixing to be at least about 35 seconds. The method of manufacturing an asphalt mix extends the length of the dry mixing until moisture is substantially driven off.

In the preferred embodiment, the inventive method of manufacturing an asphalt mix comprises: heating aggregate; introducing RAP to the aggregate; dry mixing the RAP and aggregate; forming a coating of AC on all aggregate during the step of dry mixing; separately blending AC, biodegradable solvents, and anti-stripping agent to produce a blend; and wet mixing the blend into the RAP and aggregate mix.

The method of manufacturing an asphalt mix contemplates biodegradable solvents that are capable of making the asphalt mix workable at ambient temperatures. The biodegradable solvents comprise pine extract and biodiesel. The method of manufacturing an asphalt mix contemplates a length of the dry mixing step to be at least about 35 seconds. The method of manufacturing an asphalt mix extends the length of the dry mixing until moisture is substantially driven off.

The inventor of the present invention has identified problems with the prior art asphalts.

Cold mix asphalt is asphalt cut with a solvent and workable at ambient temperatures. Prior art traditional cold patch includes a petroleum solvent. The petroleum may be diesel, tulene, kerosene, or naphthalene. The solvent may make it workable at ambient temperatures. Traditionally, most cold mix asphalts are 100% virgin materials.

Prior art asphalt mixes include hot mix asphalt (HMA) which is only workable at temperatures of 250 to 350 degrees F.

Traditionally, cutback asphalts have petroleum solvents in them. Such solvents can be harmful to the environment. No one is pleased with the traditional cutback asphalts because of the negative environmental effects. The toxic petroleum leaks out and causes environmental damage. The petroleum solvent also evaporates into the atmosphere.

The Marathon Patent uses biodiesel. The Marathon Patent is for paving not for patching. It is a cutback asphalt. The asphalt is created and used to pave as needed. The Marathon Patent has little use since hot mix asphalt is typically used for paving. There is no real world application for the product of the Marathon Patent. Hot mix asphalt is readily available for paving. Further, the asphalt of the Marathon Patent is better when warm or heated. Tests of an asphalt made substantially in accordance with the methods of the Marathon Patent confirm that it is for use when warm.

A product substantially in accordance with the Marathon Patent was tested and does not work for patching. It is not workable at ambient temperatures and requires machinery to place the material. When asphalt prepared substantially in accordance with the Marathon Patent was tried for use in patching it did not work. The worker could not get the product into the application such as a hole, and the product failed miserably for patching. Mechanical machinery would have been required to get the product into the hole.

The product of the Marathon Patent further has a problem with stockpiling the material. It can not be sold in bags because the material is too stiff. It sets in the bag and has a short shelf life.

The asphalt of the Marathon Patent is not a cold mix asphalt or a hot mix asphalt. It is best when the material is warmed. See col. 7, lines 3-16. The Marathon Patent refers to "[S]afe use of the cutback asphalt at elevated temperatures." It further explains:

"For some applications, a customer might want to heat the cutback asphalt to facilitate the application, promote the removal of excess moisture on the roadway, and/or encourage prompt "setting up" of the cutback solvent, both from cooling and some evaporation of biodiesel solvent.

Use of biodiesel based cutback asphalt, especially when applied relatively hot, creates a new class of building materials, with low volatility and low toxicity, approaching that of neat asphalt cement, but which does not require the amount of heating required for a conventional hot mix application."

Biodiesel has a low vapor pressure and does not evaporate readily.

The inventors of this application estimate that the asphalt of the Marathon Patent has a warm temperature of 130 to 195 degrees F. for workability and placement. This is the compaction temperature. Once the asphalt is laid on the road it can be compacted with a roller at this temperature. The material is still warm when placed.

In contrast to the invention, the asphalt of the Marathon Patent should be used at an elevated temperature and stockpiled while still warm. It must be used while there is still residual heat from production.

The Marathon Patent states at col. 3, lines 18-21 that a pile of the patch material "was readily worked" after two months in storage, however, patch material made substantially in accordance with the Marathon Patent could be stockpiled for only short periods of time. After a period of time of 2½ weeks to 3 weeks, the material hardened and the entire pile was useless, but for recycling.

At Col. 1, lines 24-26, the Marathon Patent provides the following definition: "Cutback asphalts-an asphalt softened with petroleum solvent, e.g., asphalt cement with gasoline or diesel fuel, for patching." The Marathon Patent states "Cutback asphalts are used for patching and some types of new road construction or resurfacing, though primarily in cooler months." Col. 1, lines 30-32. As stated in the Marathon Patent, "Conventionally, cutback asphalt is used for patching, especially in cooler climates and/or winter months. To make the asphalt soft enough to work with, and/or reduce or eliminate the amount of heating needed to make the material workable, a petroleum solvent is dissolved in the asphalt. Such "cold patch" materials are frequently made in advance and stockpiled to provide a source of material for patching." Col. 1, lines 45-52.

The inventors of this application estimate that Example 1 of the Marathon Patent has a temperature of 130 to 195 degrees F. for low viscosity and workability. Otherwise, the asphalt cement would be hard. The blend is heated and made in the tank in the production facility. The components mentioned in the Marathon Patent example 1 are only about 5% of the mix. The other 95% is stone and sand. The stone and sand are also blended in the production facility. The mix is then stockpiled. The mix is still hot while stockpiled. A crust forms on the stockpile and the crust may become waste material. The mix is about 150 degrees F. inside the crust. No further heating is done, but the mix is still warm. The mix is shoveled into a truck and trucked to the site and pushed into holes and compacted. There is no heating at the site, but the mix is still warm.

Basically asphalt typically has petroleum products in it. Cities temporarily fix pot holes or use temporary "Cold patch" asphalt to temporarily (even overnight) cover up holes made by construction work to gain access to utilities in the street like the sewer, gas, water lines, electric lines etc. Frequently, a metal cover is put over the hole and cold patch asphalt is used to secure the metal plate until the next morning when the construction work begins again. The temporary asphalt is different than permanent asphalt. In the past, the temporary asphalt had petroleum products in it. The petroleum leaks out or in the summer heat can be smelled in the air. The petroleum is an environmental problem and gets into rain water and run off and pollutes. The Marathon Patent uses biodiesel in the asphalt instead of petroleum products and is environmentally safe, i.e. it is a "green" product. It, however, is not workable at ambient temperatures when made and tested.

Thus, there is a need for an asphalt mix that is workable at ambient temperature, and is environmentally safe, with only biodegradable solvents. There is a need for an asphalt mix that is workable at ambient temperature, and has pine extract and biodiesel solvents. There is a need for an asphalt mix that has biodegradable solvents that are capable of making it workable at ambient temperature. There is a need for an asphalt mix that uses RAP. There is a need for an asphalt mix that can be stockpiled and bagged and stored and sold in bags.

There is a need for a new method of manufacturing an asphalt mix comprising blending AC and pine extract. There is a need for a method of manufacturing an asphalt mix comprising extending a length of dry mixing RAP and aggregate. The method of manufacturing an asphalt mix contemplates a length of the dry mixing to be at least about 35 seconds. The method of manufacturing an asphalt mix extends the length of the dry mixing until moisture is substantially driven off. There is a need for a method of manufacturing an asphalt mix with a dry mix step that decreases the absorption of the asphalt wet mix blend of AC, pine extract, biodiesel, and anti-stripping agent into the stone.

There is a need for a method of manufacturing an asphalt mix comprising forming a coating of AC on all aggregate during a step of dry mixing RAP and aggregate. The method of manufacturing an asphalt mix extends the length of the dry mixing until moisture is substantially driven off. The method of manufacturing an asphalt mix contemplates a length of the dry mixing to be at least about 35 seconds.

The invention is an asphalt mix for patching holes and cracks, not for paving a street. The asphalt of the invention is used when "cold" (i.e., at ambient temperatures) for patching and stops a hole from getting larger. It stops spalling, the breakup and roll out of pavement material. It repairs deficiencies in asphalt material. Patching and paving are two different applications for asphalt. The invention is for use at ambient temperatures. It is workable at ambient temperatures without machinery. It is for patching and sold in bulk and bag quantities. It can be sold in bags and does not set in the bags. It has a good shelf life for stockpiling.

The asphalt mix of the present invention is for patching, not for paving. The invention replaces a solvent such as a petroleum solvent like diesel, tulene, kerosene, or naphthalene, with a biodegradable solvent. Plant biodiesel is biodegradable and is a renewable solvent. The invention includes biodiesel plus a pine tar extract additive. Pine tar extract additive is also biodegradable and renewable.

Pine extract is not a biodiesel. Biodiesel can be defined as the mono alkyl ester of a long chain fatty acid derived from renewable lipid sources. Suitable sources include animal fats and vegetable oils. A preferred material is biodiesel made from soy bean oil. See Marathon Patent, col. 3, lines 54-57. Pine extract is made from the sap and/or byproducts of pine trees. It is a terpene hydrocarbon solid. It is ordered from the company ARRMAZ and is readily available.

The asphalt mix of the invention has low viscosity at ambient temperatures and is workable at ambient temperatures. Viscosity is the resistance to flow. Water is less viscous than molasses.

Additionally, the invention is 40% post industrial waste. This is recycled asphalt pavement or recycled asphalt product (RAP). It is essentially old pavement.

The invention requires biodiesel and pine extract. The biodiesel and pine tar extract are blended in a blending tank. The blend is 24% to 32% biodiesel and 1% to 7% pine extract. The pine decreases the viscosity to make the product more workable and softens the product. Both biodiesel and pine extract are biodegradable softening solvents.

An anti-stripping agent may be used. This helps the asphalt tar to stay in place on the stone.

An anti-stripping agent reduces the stripping of material from the stone. Stripping is when the asphalt cement (and biodiesel/pine extract) blend strips off the stone. It hurts the integrity of the road patch. Most municipalities and states permit no more than 10% of the material to be uncovered after a 15 minute test of the material for stripping. The low viscosity of a cutback asphalt (which includes a petroleum solvent to cutback viscosity) increases stripping, where the asphalt cement does not bind with the stone.

In the invention, when the viscosity is lowered by the biodiesel/pine extract blend as a solvent, stripping is also increased and an anti-stripping agent is also needed.

The product of the invention includes four elements: (1) course aggregate, (2) fine aggregate, (3) RAP, and (4) a blend of asphalt cement, biodiesel, pine extract, and anti-stripping agent. The course aggregate is stone which may be virgin quarried stone. The fine aggregate is sand which may be virgin quarried sand. The RAP is recycled asphalt pavement graded to course aggregate. The blend is of asphalt cement, biodiesel, pine extract, and an anti-stripping agent. Asphalt is a blend of course aggregate, fine aggregate, and tar. Asphalt cement is the tar.

In the preferred example of the invention the amount of the four elements were as follows: (1) course aggregate—36.5%, (2) fine aggregate—18%, (3) RAP—40%, and (4) a blend—5.5%—of asphalt cement, biodiesel, pine extract, and anti-stripping agent. These percentages are approximate. They may vary by about 1 to 2%.

In one example of the invention the amount of the elements of the blend were as follows: asphalt cement—67.5%, biodiesel—24%, pine extract—7%, and anti-stripping agent—1.5%. These percentages are approximate. They may vary by about 1 to 2%. These percentages are of the 5.5% of blend (in other words, the biodiesel is 24% of the 5.5% which is the blend).

In the preferred example of the invention the amount of the elements of the blend were as follows: asphalt cement—70%, biodiesel—28%, pine extract—1%, and anti-stripping agent—1%. These percentages are approximate. They may vary by about 1 to 2%. These percentages are of the 5.5% of blend (in other words, the biodiesel is 28% of the 5.5% which is the blend).

The invention has no water in it and is not an emulsion.

The asphalt cement is the heavy portion of crude oil from refining. Jet fuel is the light portion of the crude oil. Viscosity is the resistance to flow of a fluid or semi-fluid. The asphalt cement or tar is more viscous at room temperature than when heated. Traditionally, a solvent with petroleum in it is cutback into the asphalt cement to make it less viscous and workable and easy to place. The viscosity is reduced or cutback by the solvent. The asphalt mix of the present invention is free of petroleum solvents and uses only biodegradable solvents.

The RAP is crushed to ⅜" and minus. RAP is screened to remove all fine aggregate. RAP course aggregate is utilized in the manufacturing.

In the invention, the material is workable at ambient temperature. No heating is needed to work the asphalt. The invention is an asphalt that is soft and workable and has low viscosity at ambient temperature.

Heat is applied for mixing. A temperature of about 300 degrees F. is used for mixing to melt the AC in the RAP. This temperature drives off moisture from the RAP. The resulting temperature is approximately 225 degrees F. which distributes the AC across all aggregates. After introducing the AC, biodiesel, and pine extract blend, the resulting temperature is about 190 degrees F. An ambient temperature may be achieved before use. The product of the invention may be stockpiled and bagged and may be used at room temperature. The resulting asphalt mix may be used at temperatures from freezing to yearly high temperatures.

The asphalt mix of the invention has a shelf life that is guaranteed for 2 months when stockpiled but is more typically 3-4 months in a stockpile. The bagged product has a longer life expectancy and works still after one year.

When asphalt is stockpiled it is left out in the open and subject to the weather and elements such as rain and cold. Thus, solvents can evaporate out more readily than when the asphalt is bagged. Stockpiled asphalt has a shorter useful life as a result. The shelf life of stockpiled asphalt in accordance with the invention is 3 to 4 months. In contrast, bagged asphalt is sealed in the bag and is less volatile. The solvents do not readily evaporate out. The shelf life of bagged asphalt in accordance with the invention is one year.

Further, the invention involves a mixing procedure in order to effectively utilize the recycled asphalt tar on the recycled product. The invention is a cold patch, for use at ambient temperatures. It provides the advantages of not needing to heat the material for use, or after being laid, of not having to wait for it to cool. The machinery and precautions necessary for HMA are not needed. The asphalt mix of the invention has no toxicity, and there is no environmental hazard.

The invention further contemplates a method of manufacturing an asphalt mix. The method of the invention has a step of dry mixing RAP, and hot virgin aggregate. The virgin aggregate comprises coarse and fine aggregate. The method of the invention contemplates extending the length of time for dry mixing RAP, and hot virgin aggregate as compared to prior art methods of manufacturing asphalt. In prior art methods for hot mix asphalt, the dry mixing step is about 15 seconds. In contrast, in the invention, the dry mix step is extended to at least about 35 seconds or greater depending on the moisture content. It may take up to about one and a half minutes. The more moisture, the longer the length of time for the dry mix step. During the dry mix, moisture is driven off the aggregate and the AC in the RAP is melted and coats the aggregate forming a thin coat (or film) on the virgin aggregate. The film is formed on all the aggregate, even the aggregate in the RAP, not just on the virgin aggregate. The heat allows RAP AC to melt and coat all aggregates, virgin and recycled, evenly.

It is the understanding of the inventors of the present invention that the dry mix step decreases the absorption of the asphalt wet mix blend of AC, pine extract, biodiesel, and anti-stripping agent into the stone. The film creates a seal on the stone. The blend of AC, pine extract, biodiesel, and anti-stripping agent does not soak into the virgin aggregate and penetrate the stone as readily. Thus, the blend of AC, pine extract, biodiesel, and anti-stripping agent does not get inside the microfractures in the stone as readily. The thin coat or film of AC seals the microfractures so that the AC in the AC, pine extract, biodiesel blend does not necessarily penetrate these fractures. This reduces the amount of blended material of AC, pine extract, biodiesel, and anti-stripping agent used and is cost effective.

The inventors of the present invention theorize that the dry mix step decreases the absorption of the asphalt wet mix blend of AC, pine extract, biodiesel, and anti-stripping agent into the stone by creating a membrane that seals the stone. The membrane may be an impervious membrane.

An expectation of penetration of AC into stone is theorized. The effective AC is the AC that binds the materials. The total AC is the sum of the effective material and the AC that is used for coating the material. Dry mix times are extended to increase the effective AC content of the final product. RAP AC is utilized to coat and seal all aggregate to prevent the unnecessary absorption of AC/diluent blend when introduced during wet mix. During the dry mix step, the RAP AC is distributed over all aggregates (stone, sand and recycled aggregate from the RAP). As understood, the reclaimed AC penetrates the microfractures in the stone and sand, sealing them with a film or coat. The thin film or coat creates a barrier which the AC/biodiesel/pine extract blend does not penetrate during the wet mix step. By sealing the stone the effective AC in the blend rises since it is not needed to fill the microfractures in the aggregate. This allows less AC/biodiesel/pine extract blend to be used by weight.

The method of the invention increases the effectiveness of the AC, pine extract, biodiesel, and anti-stripping agent blend by forming a film on all of the aggregate that seals the stone from absorption. The amount of blended material of AC, pine extract, biodiesel, and anti-stripping agent used is reduced. The blend of the invention is estimated to be about 100% effective rather than just an estimate of 70 to 80% effective for the prior art cold mix asphalts. The inventive method and asphalt uses RAP in an extended dry mix step that forms a sealing film on all the aggregate.

The step of dry mixing is followed by a step of wet mixing the additional ingredients. The RAP and aggregate mix is mixed with the AC, biodiesel and pine extract blend.

Prior art cold patch asphalts typically use all virgin material. They do not use an extended dry mix step to coat the virgin aggregate with the AC from RAP. Any dry mix step for such prior art cold patch asphalts is the industry standard of only 15 seconds. Moisture is not substantially driven off in just 15 seconds. Though such prior art cold patch asphalts are workable at ambient temperatures, this is only because of high quantities of diesel solvent to cutback the viscosity. They are not environmentally safe and petroleum leaks from the patch to the environment. They should not be used near wet lands or parks. Precautions must be used to deal with the toxicity of the petroleum.

In the invention, heat is applied for blending. In the dry mix step, the RAP starts out at ambient temperature and a temperature of about 300 degrees F. is used for blending to melt the AC in the RAP. The temperature range may be 300-350 degrees F. This temperature is achieved for the virgin aggregate. Virgin aggregate temperatures are nearly 60% less then similar HMA temperatures using the same amount of RAP. The temperature then drops to 212 to 230 degrees F., preferably 212 to 215 degrees F., due to the lower temperature of the RAP. This is the temperature before the wet mix step.

The AC tanks maintain the AC at a temperature of 300 to 350 degrees F., preferably 300 to 325 degrees F. The pine extract, biodiesel, and anti-stripping agent are at ambient temperature. They are blended into the AC. The resulting temperature is about 210 degrees F.

In the wet mix step, the previously blended AC, pine extract, biodiesel, and anti-stripping agent are introduced and blended into the mix of RAP and virgin aggregate. After the wet mix step, the resulting temperature is about 190 degrees F.

The benefits of the invention include:
1. an asphalt that is environmentally safe and non-toxic in use and afterwards; and
2. an asphalt that is workable at ambient temperatures without machinery.

The method of manufacturing an asphalt mix includes the following benefits:
1. increased effectiveness of the AC, biodegradable solvent, anti-stripping agent blend by preventing unnecessary absorption into the stone; and, thus,
2. reducing the amount of AC, biodegradable solvent, anti-stripping agent blend needed.

Figure 1A:
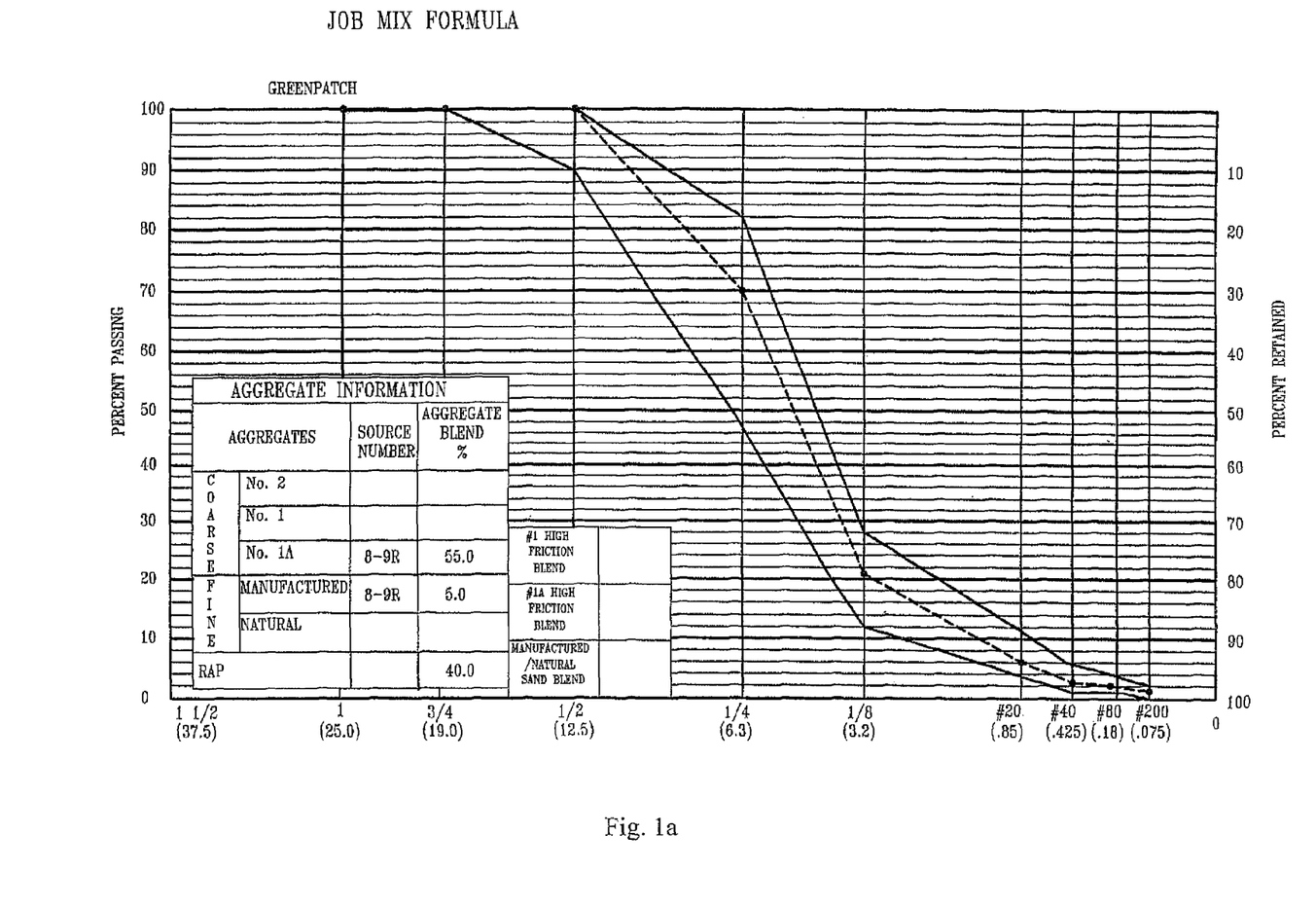
FIG. 1a is a mix formula graph showing aggregate gradation having percent passing/percent retained on the vertical axis and size of particles discriminated by a sieve on the horizontal axis.

The graph of FIG. 1a shows aggregate gradation for the asphalt mix. The graph depicts percent passing/percent retained on the vertical axis and size of particles discriminated by a sieve on the horizontal axis. The graph is a 0.45 power chart. The horizontal axis is indicative of the size of particles retained by a sieve. At the left of the horizontal axis, the size of the particles is given in inches (and millimeters shown in parentheses below the value in inches). The scale goes from 1½ inches to ⅛ inches. At the right of the horizontal axis, the size of the particles is indicated by ASTM sieve designation numbers from #20 to #200. (A corresponding value in millimeters is shown in parentheses below the value for ASTM sieve designation numbers). The vertical axis gives percent passing/percent retained. If 100% of the aggregate is passed for a sieve for 1½ inch particles, then 0% is retained. The left vertical scale gives the percent passing value, and the right vertical scale gives the percent retained value. If 48% of the aggregate is passed for a sieve for ¼ inch particles, then 52% is retained. If 0% of the aggregate is passed for a sieve with the ASTM sieve designation number of 200, then 100% is retained. The graph shows how much aggregate material is passed/retained for each particle size.

The gradation is combined for all aggregates in the mix. A worksheet of three tables FIGS. 2a-2c shows values for the individual aggregates in the mix.

Figure 1B:
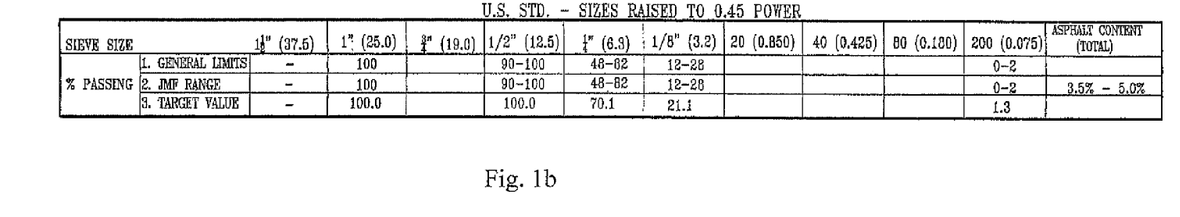

A table in FIG. 1b gives the data graphed in the graph of FIG. 1a. It gives values for the percentage passing in general limits, JMF (job mix formula) range, and target value. The dotted line of the graph of FIG. 1a is the target value or actual value. In contrast, the upper and lower solid line graphs show the upper and lower limits, respectively, for the mix. For example, for ½ inch particles, the target value in the table of FIG. 1b is 100. The graph of the dotted line has a point at 100. From the table of FIG. 1b, the general limits are 90-100. Thus, the lower limit is 90 and the graph shows a point at 90 percent passing. Thus, the upper limit is 100 and the graph shows a point at 100 percent passing. For ¼ inch particles, the target value in the table of FIG. 1b is 70.1. The graph of the dotted line has a point at 70.1. From the table of FIG. 1b, the general limits are 48-82. Thus, the lower limit is 48 and the graph shows a point at 48 percent passing. Thus, the upper limit is 82 and the graph shows a point at 82 percent passing. For ⅛ inch particles, the target value in the table of FIG. 1b is 21.1. The graph of the dotted line has a point at about 21. From the table of FIG. 1b, the general limits are 12-28. Thus, the lower limit is 12 and the graph shows a point at 12 percent passing. Thus, the upper limit is 28 and the graph shows a point at 28 percent passing.

Figure 2A:
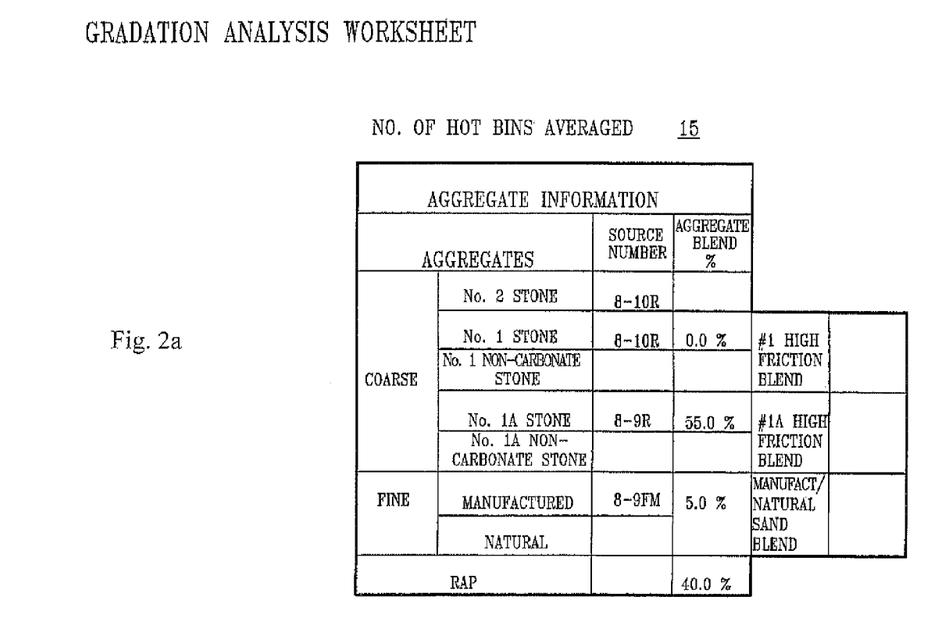
FIG. 2a is a table of the gradation analysis worksheet and gives the aggregate information.
Figure 2B:
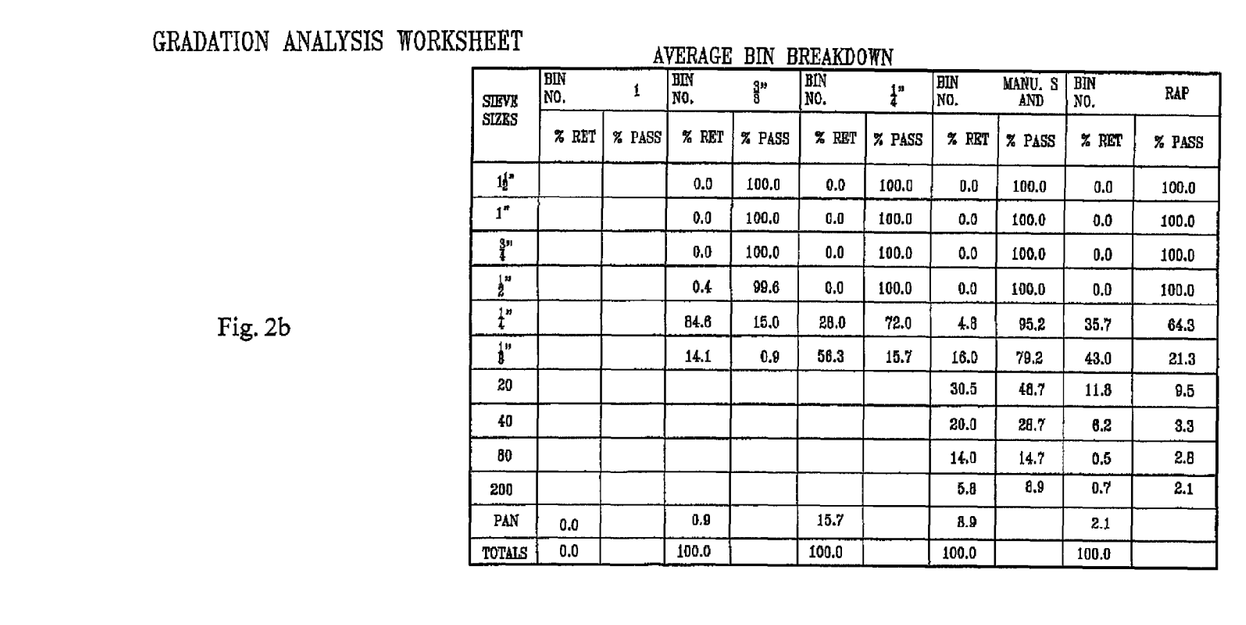
FIG. 2b is a table of the gradation analysis worksheet and gives average bin breakdown.
Figure 2C:
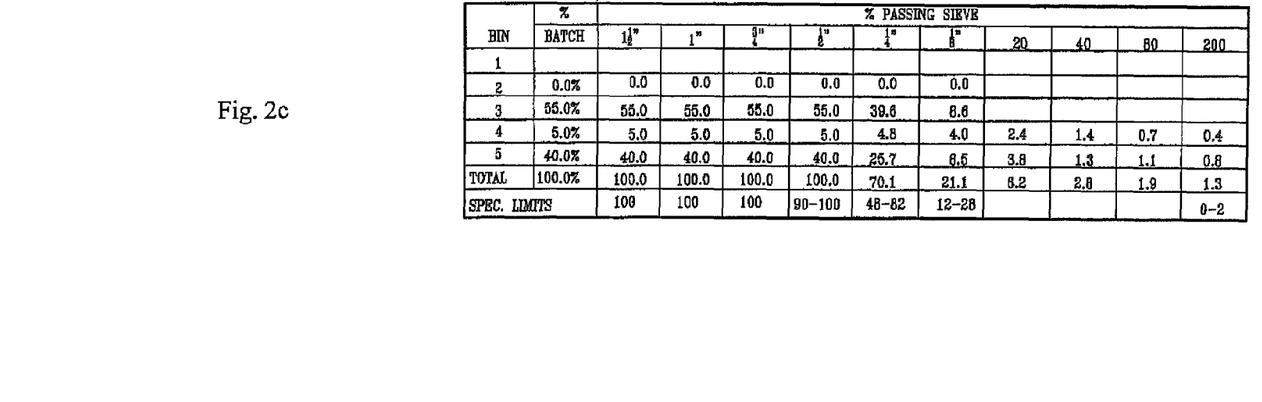
FIG. 2c is a table of the gradation analysis worksheet and gives the percent passing through the sieve for numerous sieve sizes.

FIGS. 2a-2c are a gradation analysis worksheet comprising three tables. FIG. 2a is the aggregate information table. FIG. 2b gives average bin breakdown. FIG. 2c gives the percent passing through the sieve for numerous sieve sizes. The row labeled Total of FIG. 2c gives the values listed as the target value in the table in FIG. 1b which are graphed in FIG. 1a. One purpose of the gradation analysis work sheet of FIGS. 2a-2c is to obtain the values graphed in FIG. 1a.

The gradation analysis worksheet of FIGS. 2a-2c is to determine the proper aggregate structure in order to put together an aggregate mix. It quantifies the matrix of the aggregate. FIG. 2a gives the aggregate information for the total aggregate blend which does not include the oil or AC. It includes aggregate from the coarse aggregate, fine aggregate and the RAP. The values in the column labeled Aggregate Blend % are maximum amounts. The coarse aggregate employed is No. 1A stone which is ¼ inch stone. The table gives the following maximum values: coarse aggregate 55%, fine aggregate 5%, and RAP 40%.

The average bin breakdown table of FIG. 2b gives values for manufactured sand as opposed to natural sand. The row labeled PAN gives the finest particles or dust content.

The table of FIG. 2c shows that everything passes through the sieves with sizes 1½ inches, 1 inch, ¾ inch, and ½ inch. The row labeled Total indicates 100% passing for these sieve sizes. The percent passing differs for other sieve sizes. BIN 3 is the coarse aggregate which is 55% of the total blend. The coarse aggregate is 39.6 percent of what passes through the ¾ inch sieve. This value is obtained in the following manner: Looking at FIG. 2b, for ¼ inch stone (No. 1A stone for coarse aggregate) and the sieve size ¼ inch, there is a 72% passing value. The following calculation results in the value shown in FIG. 2c:

$$72 \times 0.55 = 39.6$$

Similarly, for the ⅛ inch sieve, for the coarse aggregate of ¼ inch stone, FIG. 2b shows the value of 15.7 percent passing. The value in FIG. 2c is obtained in the following manner: Looking at FIG. 2b, for ¼ inch stone (No. 1A stone for coarse aggregate) and the sieve size ⅛ inch, there is a 15.7% passing value. The following calculation results in the value shown in FIG. 2c:

$$15.7 \times 0.55 = 8.6$$

The invention provides an asphalt mix with low viscosity at ambient temperatures, which is workable at ambient temperatures without machinery and which eliminates petroleum solvents beyond trace amounts used to denature soy biodiesel. A minute amount of diesel fuel, about $\frac{1}{10}^{th}$ of 1%, may be used to denature soy biodiesel. There is no problem with leaking petroleum, no danger to the environment, and no petroleum toxicity. The invention is a petroleum free/"green" asphalt workable at ambient temperatures. No petroleum cutback solvents are used. The invention only uses biodegradable solvents. Those solvents are pine extract and biodiesel.

The invention contemplates the method or process for manufacturing the asphalt mix of the invention. The method is illustrated by the following examples:

EXAMPLES

Example 1

Formulation

The mix comprised four elements in percentages as follows: (1) course virgin aggregate—36.5%, (2) fine virgin aggregate—18%, (3) RAP—40%, and (4) a blend 5,5%—of asphalt cement, biodiesel, pine extract, and anti-stripping agent. The RAP was crushed to ⅜" and minus. RAP was screened to remove all fine aggregate. RAP course aggregate was utilized in the manufacturing.

The composition of the blend was as follows: asphalt cement—70% PG 64-22, biodiesel—28%, pine extract—1%, and anti-stripping agent—1%.

Method of Manufacture

First, there was a dry mix step which was extended to 35 seconds. Virgin aggregate started at ambient temperature and was heated to 300 degrees F. The RAP started at ambient temperature and was introduced to the virgin aggregate. The product was mixed for 35 seconds. The time for dry mixing depends on the amount of moisture and is extended until all moisture is driven off and the AC is dispersed over all aggregates. Although 35 seconds is a starting point, the time needed is relative to the time it takes to remove moisture and distribute the AC. This could take as much as about a minute and a half.

The temperature dropped to about 212 to 215 degrees F., due to the lower temperature of the RAP. This was the temperature at the beginning of the wet mix step.

Separately, the AC, pine extract, biodiesel, and anti-stripping agent blend was prepared. The AC was maintained in a tank at 300 to 325 degrees F. The pine extract, biodiesel, and anti-stripping agent started at ambient temperature. They were blended into the AC. The resulting temperature was about 210 degrees F.

In the wet mix step, the previously blended AC, pine extract, biodiesel, and anti-stripping agent were introduced and blended into the mix of RAP and virgin aggregate. After the wet mix step, the resulting temperature was about 190 degrees F.

The asphalt mix was stockpiled and/or bagged for use at ambient temperatures. The stockpiles were about 42 tons. The stockpile was readily broken to get inside. The asphalt mix was used for patching. It worked staying in the holes under traffic load. It was workable at ambient temperatures for 4 months from the stockpile and 1 year from the bags.

The crusted material on the outside of the stockpile was integrated back into the workable material with some manipulation and was salvageable rather than wasted.

Example 2

Formulation

The mix comprised four elements in percentages as follows: (1) course virgin aggregate—36.5%, (2) fine virgin aggregate—18%, (3) RAP—40%, and (4) a blend—5.5%—of asphalt cement, biodiesel, pine extract, and anti-stripping agent.

The composition of the blend was as follows: asphalt cement—67.5%, biodiesel—24%, pine extract—7%, and anti-stripping agent—1.5%.

The method of manufacturing was the same as for Example 1.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Though the exact percentages are defined and set for the user of the asphalt mix and method of manufacturing an asphalt mix, the stated percentages are examples and are approximate. Thus, the percentages may be defined as 1% of the pine extract and 28% of the biodiesel. The approximations may be plus or minus a certain percent such as 1% or 2%. The range for pine extract may be 0.5% to 7.5% and the range for biodiesel may be 23.5% to 32.5%. The amount of RAP may be 40% plus or minus about 5%. Many of those undescribed variations, modifications and variations are within the literal scope of the following claims, and others are equivalent.

What is claimed is:

1. A method of manufacturing an asphalt mix comprising
heating aggregate;
introducing RAP to the aggregate;
dry mixing the RAP and aggregate;
separately blending AC, biodegradable solvents capable of making the asphalt mix workable at ambient temperatures, and anti-stripping agent to produce a blend; and
wet mixing the blend into the RAP and aggregate mix.

2. The method of manufacturing an asphalt mix of claim 1, comprising blending AC, pine extract and biodiesel.

3. The method of manufacturing an asphalt mix of claim 1, wherein the dry mixing step is for a length of time at least about 35 seconds.

4. The method of manufacturing an asphalt mix of claim 1, wherein the aggregate comprises coarse virgin aggregate and fine virgin aggregate.

5. The method of manufacturing an asphalt mix of claim 1, wherein virgin aggregate is heated before the dry mix step to be hot.

6. The method of manufacturing an asphalt mix of claim 1, comprising introducing the RAP in an amount to make up about 40% of a final asphalt product.

7. The method of manufacturing an asphalt mix of claim 1, wherein the dry mixing step is for a length of time which is extended until moisture is substantially driven off.

8. The method of manufacturing an asphalt mix of claim 1, wherein the RAP has AC as an ingredient and the dry mixing step is for a length of time which is extended until AC from said RAP coats all aggregate.

9. The method of manufacturing an asphalt mix of claim 1, wherein the aggregate is heated before the dry mix step to be hot.

10. The method of manufacturing an asphalt mix of claim 1, wherein the aggregate is heated before the dry mix step to be hot and wherein no heat is added during the dry mix step.

11. The method of manufacturing an asphalt mix of claim 1, further comprising stockpiling the asphalt mix.

12. The method of manufacturing an asphalt mix of claim 1, further comprising bagging the asphalt mix.

13. The method of manufacturing an asphalt mix of claim 11, further comprising stockpiled asphalt mix having material near an outside surface and manipulating encrusted material on the outside surface of the stockpiled cold asphalt mix back into the stockpile.

14. A method of manufacturing an asphalt mix comprising:
heating aggregate;
introducing RAP to the aggregate;
terminating the application of heat;
dry mixing the RAP and aggregate;
forming a coating of AC on all aggregate during the step of dry mixing;
separately blending AC, biodegradable solvents, and anti-stripping agent to produce a blend; and
wet mixing the blend into the RAP and aggregate mix.

15. The method of manufacturing an asphalt mix of claim 14, wherein the biodegradable solvents are capable of making the asphalt mix workable at ambient temperatures.

16. The method of manufacturing an asphalt mix of claim 14, wherein the biodegradable solvents comprise pine extract.

17. The method of manufacturing an asphalt mix of claim 14, wherein the biodegradable solvents comprise pine extract and biodiesel.

18. The method of manufacturing an asphalt mix of claim 14, wherein the dry mixing step is for a length of time at least about 35 seconds.

19. The method of manufacturing an asphalt mix of claim 14, wherein the dry mixing step is for a length of time which is extended until moisture is substantially driven off.

20. The method of manufacturing an asphalt mix of claim 14, comprising introducing the RAP in an amount to make up about 40% of a final asphalt product.

* * * * *